Jan. 10, 1950     B. E. WILLIAMS     2,494,024
METHOD AND APPARATUS FOR REFRIGERATING
AND AGING MEAT
Filed Dec. 30, 1944     4 Sheets-Sheet 1

INVENTOR.
Beverly E. Williams
BY
ATTORNEY

INVENTOR.
Beverly E. Williams
BY
ATTORNEY

INVENTOR.
Beverly E. Williams
BY
ATTORNEY

Patented Jan. 10, 1950

2,494,024

UNITED STATES PATENT OFFICE 2,494,024

METHOD AND APPARATUS FOR REFRIGERATING AND AGING MEAT

Beverly E. Williams, Chicago, Ill.

Application December 30, 1944, Serial No. 570,521

4 Claims. (Cl. 99—194)

This invention relates to the treatment of food products. More particularly, the invention relates to the storage of food products under controlled atmospheric conditions. The invention has important application in the aging or ripening of fresh meats.

In the treatment of certain food products it is desirable to maintain the product under optimum atmospheric conditions, including temperature, humidity and air circulation, to allow the product to age or ripen without undue dehydration and deterioration. For example, in the ripening of meat it is desirable to maintain the meat for rather extended periods of time at relatively low temperatures which will allow the meat to ripen without spoilage. Heretofore, in the aging of meat, such as carcasses of beef, it has been customary to hang the meat in a commercial cooler for a period of two to three weeks or longer to allow the meat to naturally improve in flavor and tenderness. Such coolers are customarily maintained at about 32° F. to 35° F., and a relative humidity of around 80 per cent to 85 per cent. During the aging period considerable shrinkage in the meat occurs because of loss of moisture and appreciable deterioration results in quality because of discoloration of the lean and fat portion of the surface. As a result there is a loss due to dehydration and trimming, which may run as high as 10 per cent to 15 per cent or more by weight.

An object of the present invention is to provide an improved method of aging meat whereby the shrinkage and deterioration of the meat are reduced.

Another object of the invention is to provide a means of aging meat whereby the aging period is considerably lessened.

A further object of the invention is to provide an improved apparatus for aging meat whereby the aging conditions may be more precisely controlled and an improved product obtained.

The ripening of meat has not been practiced generally heretofore, and a large amount of green, tough, coarse, unripened meat, otherwise of good or choice quality has been placed on the market. Retailers have generally not practiced the aging of their meats for consumers. Hotels and restaurants have, to some extent, aged some of their choice ribs and loins and also have occasionally made arrangements with packers and jobbers to age ribs and loins for them. Since the aging operation usually results in a shrinkage loss of about 3 per cent to 5 per cent and a trimming waste of about 8 per cent to 12 per cent, difficulty has been experienced in absorbing the loss. The loss has been taken by the hotel or restaurant either as a direct weight loss or taken by the packer who has found it necessary to increase the selling price. It has been found that an improved flavor and tenderness is produced by hanging meat for a period up to about 13 days, but that further aging does not produce an improvement which is justified by enhancement in quality because the product tends to dry out thereby retarding further improvement. It has also been found that by keeping the meat during the aging period in atmosphere of high humidity the shrinkage can be substantially reduced and the ripening accomplished in a much shorter time.

The aging has been done heretofore by refrigerating the entire aging room, including the meat and equipment to about 35° F. Whenever the doors of the room are opened the temperature tends to rise and condensation of moisture from the warm outside air on the meat and equipment takes place. As a result there is a loss of refrigeration, undesirable fluctuation in temperature and deterioration of the meat. Also it has not been possible in such a room to maintain the relative humidity at or near 100 per cent. In accordance with the present invention ways and means have been provided for maintaining aging conditions of substantially constant temperature, a relative humidity near 100 per cent and slight movement of air over the product.

The invention will be more fully understood from the following description read in connection with the accompanying drawings, in which Figure 1 is a plan view partly in section of an apparatus comprising one embodiment of the invention, said view taken along the line 1—1 of Figure 3.

Figure 1:
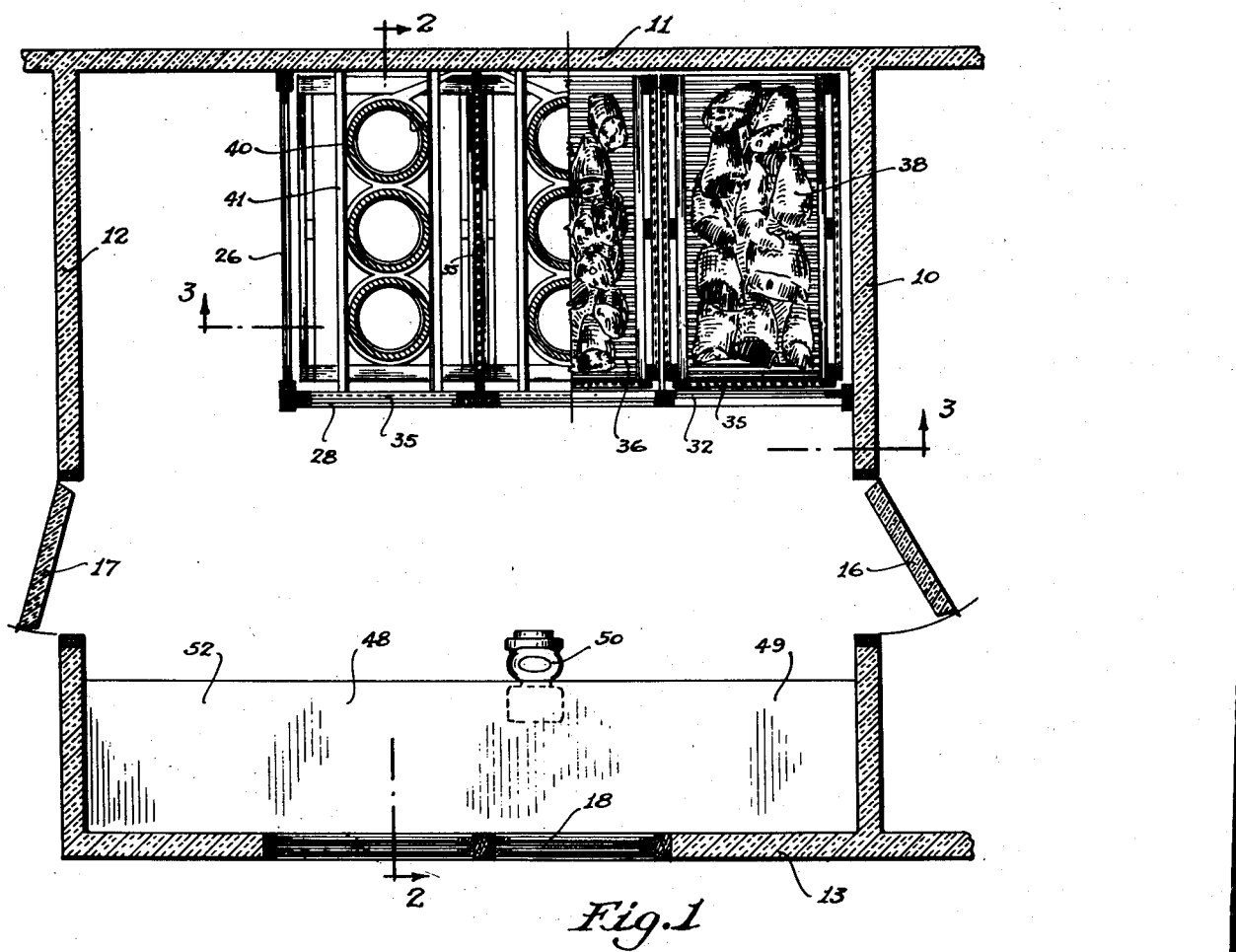

In the drawings, there is shown a butcher's room enclosed by the walls 10, 11, 12 and 13. The butcher's room may comprise all or a portion of a store, and is preferably a section of a store situated in any convenient location in the store and accessible through the doors 16 and 17 in the walls 10 and 12, respectively. The walls are preferably insulated and may comprise a double-wall made of metal or other suitable material between which may be provided any suitable insulating material. If desired, any or all portions of the wall may comprise double-wall glass with a dead air space in between, for example "Thermo-pane" glass, such as shown at 18 (Figure 1). The floor of the butcher's room may be made in any conventional manner. The roof 20 may be a regular ceiling of the store or a special ceiling for the butcher's room. In either case, it is desirable that the roof be insulated.

Figure 2:
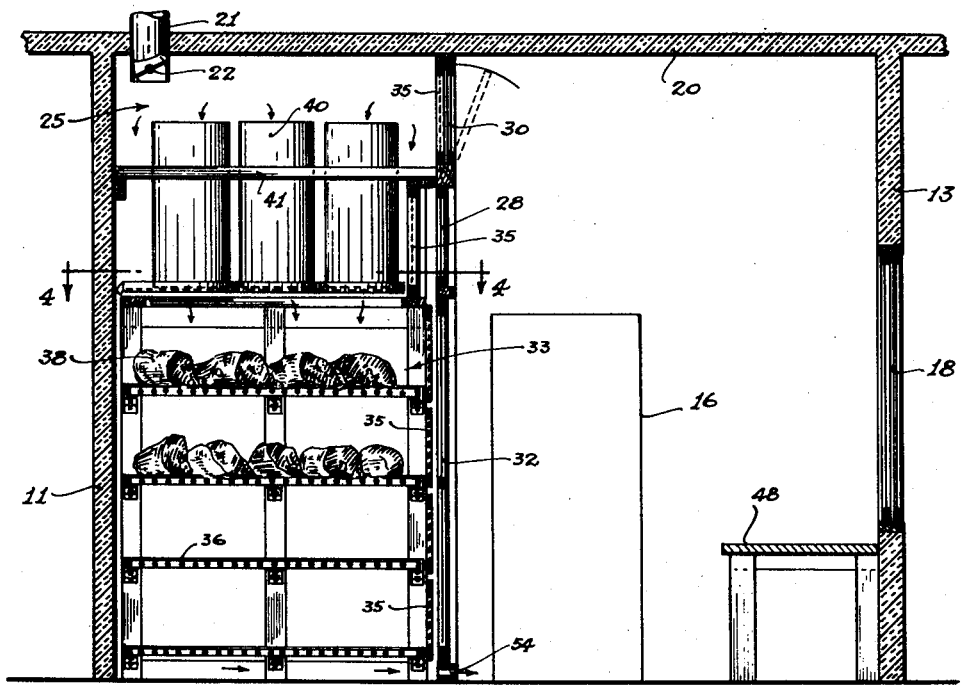
Figure 2 is a vertical sectional view taken along the line 2—2 of Figure 1.
Figure 3:
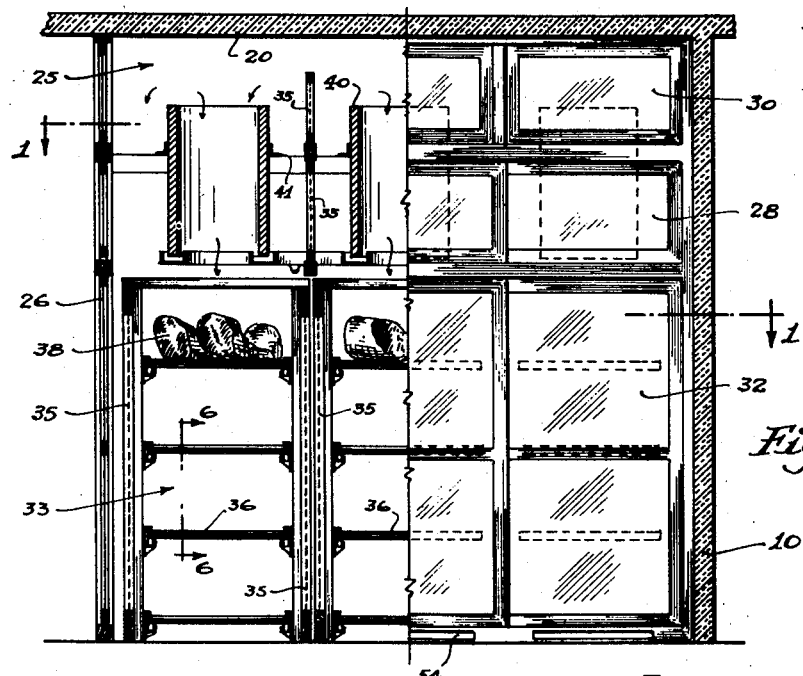
Figure 3 is a front vertical view partly in section taken along the line 3—3 of Figure 1.
Figure 7:
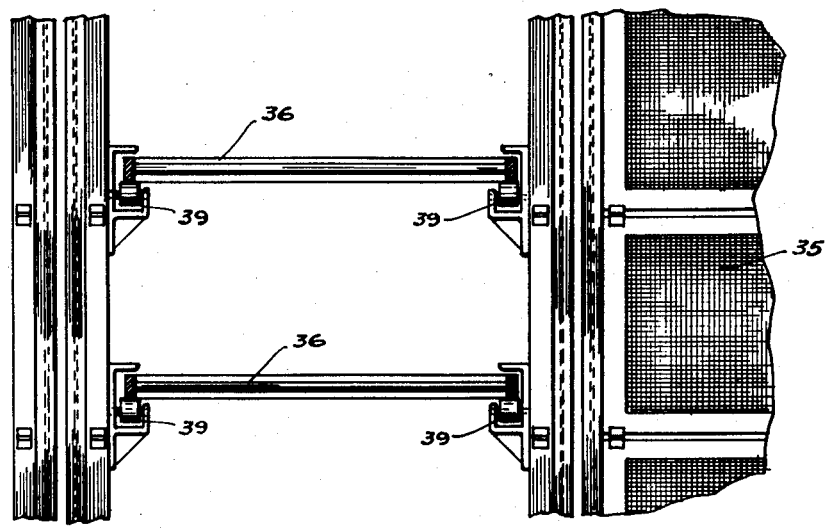
Figure 7 is a front view partly in section taken along the line 7—7 of Figure 6.

Located in the roof 20 is a vent 21 (Figure 2) controlled by a suitable damper 22. The vent 21 forms a communication between the outside air and the aging compartment 25. The aging compartment may be located in any suitable place in the butcher's room and as shown in the drawings is preferably located along one wall of the room. The walls of the aging compartment may be made of wood or metal frame containing a plurality of detachable windows 26, 28, and 30 (Figure 3). The windows 30 are preferably hinged so that they can be opened to form a transom as shown in Figure 2. The front wall of the compartment comprises removable or sliding doors 32 which cover the front of the aging racks 33. Inside the doors 32 and windows 26, 28 and 30, and along the back and side walls of the aging racks are positioned detachable or sliding screens 35 as shown in Figures 3 and 7. The screens of the inner side walls are preferably extended upwardly between the cooling units 40, as shown in Figure 3, so that a portion of the cooling units and aging racks may be at least partially segregated. Each of the cooling units or each group of cooling units may be provided with individual refrigeration systems. In this way a group of cooling units and the corresponding group of aging racks, for example, the cooling units and the aging racks between the side wall screens 35 as shown in Figure 3 may be operated and controlled substantially independently of another group of cooling units and aging racks between another set of side wall screens. Thus the three sets of cooling units and aging racks therebelow, as shown in Figure 3, may, if desired, be operated independently, as for instance, one set may be cut out entirely or if desired may be operated under different conditions from another set.

The screens 35 are preferably of sufficiently fine mesh to retard the flow of air whereby the atmosphere in the racks is sufficiently still to retard fluctuations in temperature and humidity but insufficiently stagnant to cause slime formation. A feature of the present invention is the use of the screens inside the doors 32 whereby the cold humidified air may be largely retained in the aging racks when the windows or doors are intermittently opened. Thus one or more of the doors 32 may be removed and the cold air will be substantially retarded from pouring out into the room. The screens may be made of wire or other metal and may desirably be made of materials which resist frost formation such as resinous or other fabric material such as "nylon." If desired the glass doors may be pivoted on hinges or rollers (not shown) whereby they can be raised or raised and pushed back into the aging racks.

Figure 6:
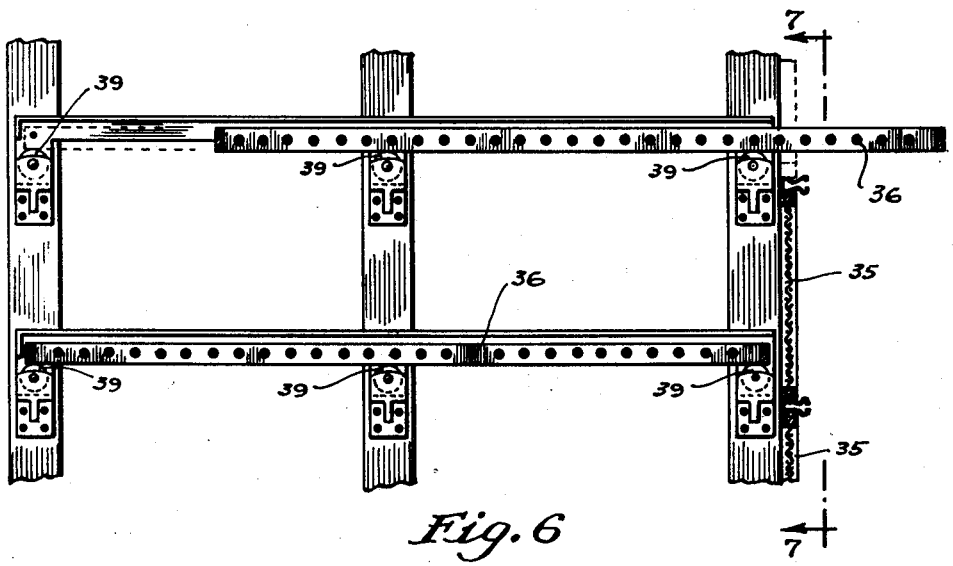
Figure 6 is a sectional side view taken along the line 6—6 of Figure 3.

As shown in Figures 6 and 7, the aging racks contain trays 36 for holding meat products 38 (Figures 2 and 3). The trays are slidable on rollers 39 so that they may be worked forward and backward to insert or remove the meat as shown in Figure 6. While the doors 32 and screens 35 are shown of such size as to cover two aging racks it is to be understood that they may be of any desirable size to cover one or more racks.

Above the aging racks 33 are cooling or refrigerating units 40 supported by a frame work 41. As shown in Figures 1 to 3 these units are cylindrical in shape and open at the top and bottom. The cylinders comprise metal shells through which a suitable refrigerant is circulated. A suitable unit for this purpose is a "Deepfreeze" apparatus, such as shown in United States Patent No. 2,356,779, although other suitable types of refrigerating apparatus may be used.

Figure 4:
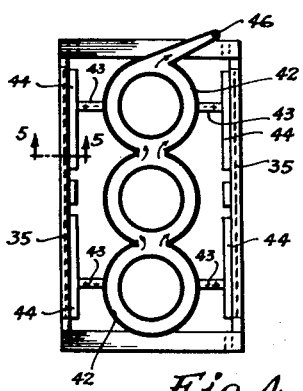
Figure 4 is a plan view taken along the line 4—4 of Figure 2.
Figure 5:
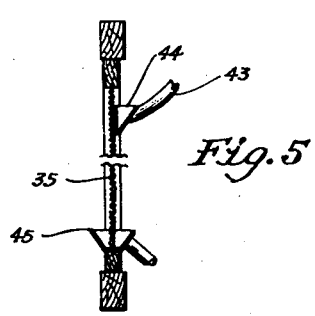
Figure 5 is a sectional view taken along the line 5—5 of Figure 4.

Air, which is usually fairly warm and somewhat saturated with moisture, enters the top of the compartment through the transom 30. The air entering the transom may be fresh air or recycled air discharged from the bottom of the aging compartment through the vent 54 (Figure 2). Usually the air entering the aging compartment is partly fresh air entering the butcher's room by doors or windows and partly recycled air. The air enters the top of the cooling units and in passing downwardly therethrough is chilled to the desired temperature. More or less circulation may occur within the aging compartment whereby air from the racks containing the meat may rise around the cooling units and pass downwardly therethrough along with the air from the transom 30. Some of the air circulating within the compartment may pass out of the transoms 30 into the butcher's room. As the air is chilled by the cooling units condensation of moisture in the cooling unit occurs. The condensation draining from the walls of the cooling units drops into the trough 42 (Figure 4) and is carried away through a drain pipe 46. The air contacts the condensate on the walls of the cooling units and in the trough and becomes substantially 100 per cent saturated. The cold saturated air being relatively heavy falls down over the meat on the aging racks.

In case further saturation of the air is desirable, a portion or all of the condensate collecting in the trough 42 may be diverted through lead lines or wicks 43 to troughs or distributing containers 44 whereby the condensate may be distributed on the screens 35. Any condensate running down the screens may be collected at the bottom in a trough 45 and conducted to a drain which discharges the excess condensate from the system.

The butcher's room, as shown in Figures 1 and 2 may contain a work table 48 on which the fresh meat may be cut preparatory for aging or the aged meat may be cut and/or wrapped for further handling such as freezing. The work or wrapping table 48 may be equipped if desired with a grinder 50 for preparing ground meat products. One end of the table 49 (Figure 1) may be used as a meat counter or block for use in cutting or carving the meat. The other end of the table 52 may be used as a wrapping counter.

In practice the temperature of the cooling units is correlated with the movement of the air and the temperature of the meat on the racks so that steady conditions of temperature and humidity are maintained. The temperature in the aging racks is maintained at about 32° to 40° F. and preferably about 34° to 37° F. The humidity is usually about 90–100 per cent relative humidity. A large cooling surface is provided by a plurality of cooling units so that the cooling surface may be maintained above freezing. The temperature differential between the cooling units and the racks is relatively small which tends to minimize thermo syphonic movement of the air and resultant dehydration of the meat. Heretofore, an inadequate amount of coils has generally been installed in coolers where meat products have been held and it has been necessary to maintain the refrigerant in the coils at temperatures considerably below freezing in order to maintain the product at temperatures just above freezing. As a result the coils frosted up from moisture derived largely from the meat products causing excessive meat shrinkage. In accordance with the present invention sufficient cooling surface is provided so that the cooling units do not go below freezing and, therefore, do not frost up and extract moisture from the product. By providing enough cooling surface it is possible to maintain the refrigerant just above freezing and the product a few degrees of temperature higher than the cooling units. Such a small temperature differential has substantially reduced thermo syphonic movement of the air and has substantially reduced dehydration of the meat products. Since the cooling units are above freezing and substantially at the dew point of the air, the moisture which accumulates on the drums in the form of condensate is readily available for re-evaporation into the air of the room. I have found that in order to maintain the cooling surface just above freezing and the meat at temperatures only 1 or 2 degrees higher than the cooling surface, it is necessary to have about 1 square foot of surface cooling area to each cubic foot of meat aging rack area. By correlating the area of the refrigerating surface with the area of the aging room and also correlating the temperature of the refrigerating surface with the optimum temperature of the meat, product dehydration is lower than that obtained heretofore in conventional meat coolers. The air exhausting from the aging racks compartment according to the embodiment shown in Figures 1–4 usually maintains sufficient refrigeration in the butcher's room to keep the temperature in said room at about 50° F. which is not too cold for the workers and yet is sufficiently cool to retard deterioration of the meat being processed.

The aging compartments containing the aging racks and the cooling and humidifying equipment may be a separate unit operated independently of the room in which they are located. Thus it is unnecessary to have circulation of air from the aging compartment to and from the room in which the compartment is located.

Figure 8:
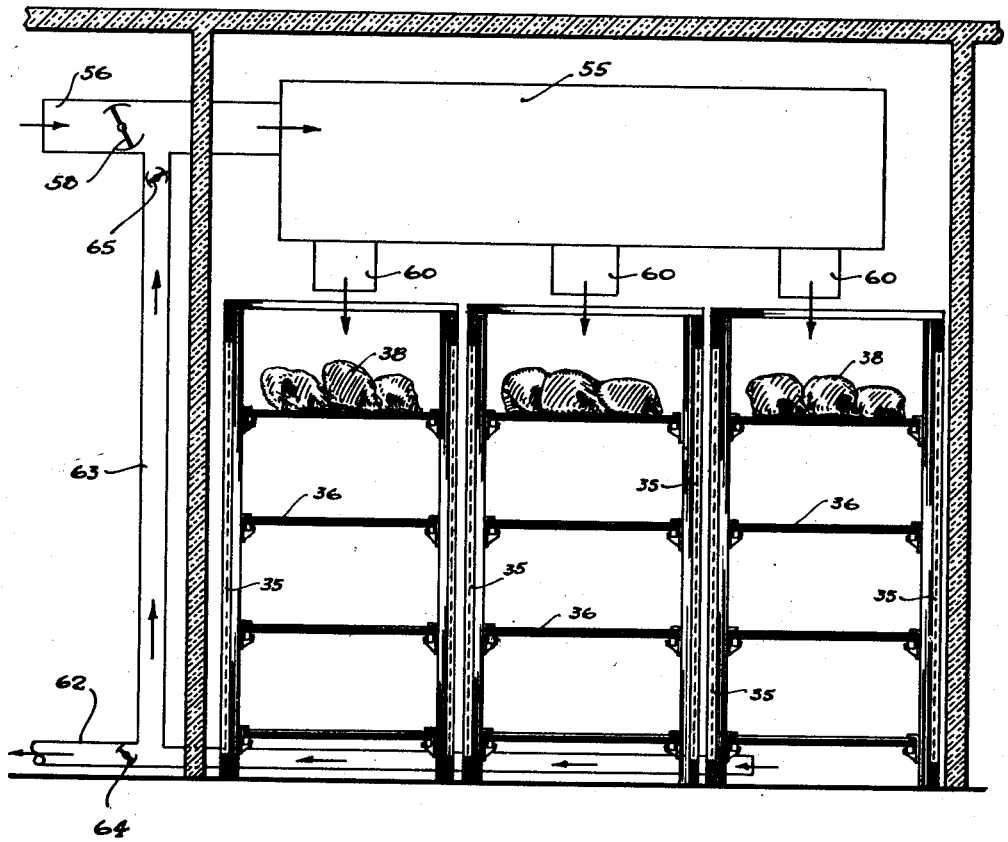
Figure 8 is a diagrammatical sketch of a modified type of cooling and humidifying unit.

In Figure 8 I have shown a modified form of aging chamber or compartment. In this embodiment of the invention, a different type of cooling and humidfying unit is employed. Such a unit may be any suitable type of air conditioning unit capable of supplying air under controlled temperature and humidity conditions. As shown in Figure 8 the cooling and humidifying unit is represented generally and designated by the numeral 55. The fresh air is charged to the unit through the inlet duct 56 controlled by damper 58. In the air conditioning unit the air is cooled to about 32° F. to 40° F. and humidified to about 90–100 per cent. The conditioned air is then discharged through the ducts 60 into the racks containing the meat. Used air is discharged from the unit through the outlet duct 62. Any portion or all of the discharged air may be recycled through the duct 63 by regulation of the dampers 64 and 65. It is usually desirable to charge fresh air, discharge used air and recycle a portion of the used air all of the same time. The continuous discharge of a portion of the used air may be desirable to avoid accumulation of odors and other impurities in the system.

The apparatus shown in Figure 8 is preferably operated independent of the room in which the aging compartment is located. Thus the intake duct 56 and the exhaust duct 62 may communicate with the outside atmosphere. However, one or both, if desired, of these ducts may communicate with a butcher's room referred to heretofore. When the aging compartments are operated as a separate unit in accordance with the preferred procedure, the butcher's room may be cooled by separate refrigerating or air conditioning equipment. While the cooling and humidifying unit is located inside the aging compartment as shown in Figure 8, the unit may be situated outside the aging compartment and the conditioned air conducted to the aging racks by suitable ducts.

The present invention produces a meat product of improved tenderness and flavor. Also losses due to shrinkage from dehydration and due to trimming are substantially reduced. The apparatus of the present invention provides an improved means of merchandising the meat which may be displayed in an attractive manner while the meat is undergoing ripening, thus commending the meat at the point of sale. Also the present invention facilitates processing and handling by aging the meat in proximity to the final operation such as cutting, freezing, wrapping, grinding, etc. In this way the butchers and other skilled operators may spend their full time on their specialized work and be relieved of sales duty which is usually required in ordinary butcher and other retail meat dispensing shops.

The feature of using an inner screen or perforated shield associated with a door or other opening substantially as described herein, may be used in connection with various types of cooling or freezing apparatus to prevent spilling out or circulation of the air when the door is opened. Thus such an arrangement may be useful in commercial and domestic coolers, freezers, refrigerators, and the like.

Obviously, many modifications and variations of the invention hereinbefore set forth may be made without departing from the spirit and scope thereof, and, therefore, only such limitations should be imposed as are indicated in the appended claims.

I claim:

1. An apparatus for treating meat comprising a meat aging chamber, a plurality of aging racks therein, detachable perforated screens surrounding individual racks and dividing said chamber into a plurality of compartments, means for charging air to said chamber, means for discharging air from said chamber, and a plurality of cooling units disposed within said chamber for cooling and humidifying said air to a temperature of about 32° F. to 40° F. and a relative humidity of above about 90%, said cooling units being maintained above freezing and being so constructed and arranged in the proportion of about one square foot of surface cooling area for each cubic foot in said compartments so that the temperature differential between said cooling units and the meat is relatively small, said perforated screens being of sufficiently fine mesh to substantially retard the flow of said conditioned air in said compartments to prevent undesirable dehydration of said meat but providing sufficient air flow to preclude slime formation on the surface of said meat and to permit diffusion of properly conditioned air between said compartments.

2. In an apparatus for treating meat, the combination of a plurality of aging racks for holding the meat, walls surrounding said racks forming a chamber, detachable perforated screens at least partially surrounding individual racks and dividing said chamber into a plurality of compartments, individual doors in said walls for communicating with each of said compartments, respectively, and means for cooling and humidifying the air in said compartments to a temperature of about 32° F. to 40° F. and a relative humidity of above about 90%, said perforated screens being of sufficiently fine mesh to substantially retard the flow of said conditioned air in said compartments to prevent undesirable dehydration of said meat but providing sufficient air flow to preclude slime formation on the surface of said meat and to permit diffusion of properly conditioned air between said compartments.

3. In an apparatus for treating meat, the combination of a plurality of aging racks; each of said racks including a plurality of shelves for holding the meat, walls surrounding said racks forming a chamber, detachable perforated screens at least partially surrounding individual racks and dividing said chamber into a plurality of compartments, individual doors in certain of said walls communicating with each of said compartments, respectively, removable screens between said doors and each of said shelves of the racks, and means for cooling and humidifying the air in said compartments to a temperature of about 32° F. to 40° F. and a relative humidity of above about 90%, said perforated screens being of sufficiently fine mesh to substantially retard the flow of said conditioned air in said compartments to prevent undesirable dehydration of said meat but providing sufficient air flow to preclude slime formation on the surface of said meat and to permit diffusion of properly conditioned air between said compartments.

4. A method of aging meat which comprises charging fresh meat to an enclosed aging zone divided into a plurality of secondary zones by the provision of perforated screens, passing air into said zones, chilling the air in said secondary zones to a temperature of about 32° F. to 40° F. by contacting said air with refrigerated surfaces whereby the air is chilled and condensation of moisture occurs on said refrigerating surfaces and on said screens, evaporating said condensate to cause the humidity of the air in said secondary zones to become substantially saturated so that shrinkage of the meat is substantially reduced, and maintaining the meat therein for a sufficient time to substantially improve the flavor and tenderness thereof, said perforated screens serving to retard the flow of said conditioned air in said secondary zones to prevent undesirable dehydration of said meat but insufficient to cause slime formation on the surface of said meat and to permit diffusion of properly conditioned air between said secondary zones.

BEVERLY E. WILLIAMS.

REFERENCES CITED

The following references are of record in the file of this patent:

UNITED STATES PATENTS

| Number | Name | Date |
|---|---|---|
| 1,988,319 | King | Jan. 15, 1935 |
| 2,017,504 | Lohner | Oct. 15, 1935 |
| 2,065,358 | Zarotschenzeff | Dec. 22, 1936 |
| 2,196,080 | Reynoldson | Apr. 2, 1940 |
| 2,267,789 | Conn | Dec. 30, 1941 |
| 2,314,301 | Williams | Mar. 16, 1943 |

OTHER REFERENCES

"The Tenderization of Meat," published 1940 by the Industrial Fellowship on Meat Merchandising, Mellon Institute, Pittsburgh, Pa. Pages 1 to 6.